United States Patent [19]
Peat

[11] Patent Number: 6,095,913
[45] Date of Patent: Aug. 1, 2000

[54] FISH SPINAL BONE REMOVAL TOOL

[75] Inventor: Nicholas Peat, Wanaka, New Zealand

[73] Assignee: Sasha St Clair, Park City, Utah

[21] Appl. No.: 09/242,766

[22] PCT Filed: Jan. 29, 1997

[86] PCT No.: PCT/NZ97/00007

§ 371 Date: Feb. 20, 1999

§ 102(e) Date: Feb. 20, 1999

[87] PCT Pub. No.: WO98/12930

PCT Pub. Date: Apr. 2, 1998

[30] Foreign Application Priority Data

Sep. 27, 1996 [NZ] New Zealand ............................ 299457

[51] Int. Cl.[7] .................................................. A22C 17/04
[52] U.S. Cl. ........................................... 452/137; 452/161
[58] Field of Search ..................... 452/137, 135, 452/136, 6, 17, 118, 161

[56] References Cited

U.S. PATENT DOCUMENTS

| | | | |
|---|---|---|---|
| 984,013 | 2/1911 | Maisel | 452/137 |
| 2,066,417 | 1/1937 | Nelms | 452/137 |
| 5,197,918 | 3/1993 | Klaassen | 452/135 |
| 5,643,074 | 7/1997 | Linnenbank | 452/136 |

FOREIGN PATENT DOCUMENTS 479186  12/1951  Canada  .................................. 452/118

*Primary Examiner*—Willis Little
*Attorney, Agent, or Firm*—Arnold Sprung

[57] ABSTRACT

A method for the removal of the spinal bones from fish, such as freshwater fish, by positioning an annular member, such as a ring attached to a shaft, around the spine of a deheaded fish and forcing it along the spine from the head portion to the tail portion of the fish, to thereby detach the spinal column from the torso of the fish and then pulling out the detached spinal column. The fish preferably has its tail cut off prior to the operation. A device for carrying out the method consists of a ring attached to a shaft with its plane extending substantially transverse to the rod. Various sized rings may be detachable connected to the shaft which may be provided with a handle.

6 Claims, 1 Drawing Sheet

FISH SPINAL BONE REMOVAL TOOL

CROSS-REFERENCE TO RELATED APPLICATIONS

Not Applicable

BACKGROUND OF THE INVENTION

This invention relates to a method and tool for manually removing the spinal and other connected bones from fish and particularly fresh water fish.

The manual removal of bones from fish is a tedious and messy procedure which often does not achieve complete bone removal.

An object of this invention is to provide a method and tool for the simple and efficient removal of spinal and other bones from fish.

A further object of this invention is a method and tool that allows a fishes spinal bones to be removed in one clean action thus eliminating time-consuming labor during processing preparations.

A further object of the invention is to provide a much cleaner filleting procedure; reduced boning time and thus more hygienic, faster, safer and efficient alternative to conventional methods.

Applicant is not aware of any Prior Art disclosing or related to the invention.

BRIEF SUMMARY OF THE INVENTION

In accordance with the invention the spinal bones and bones attached thereto are cleanly removed from the fish by de-heading the fish, preferably also cutting off its tail, positioning an annular member, preferably a ring which most preferably is attached to a shaft; around the spine, at the head portion, and passing the annular member along the spine from the head to tail portion of the fish.

This causes all the bones attached to the spine to be collapsed against the spine and be separated with the spine from the remaining carcass.

The tool for effecting the method is preferably in the form of a ring mounted on a shaft which in turn may be mounted on a stand.

DETAILED DESCRIPTION OF THE INVENTION

Figure 1:
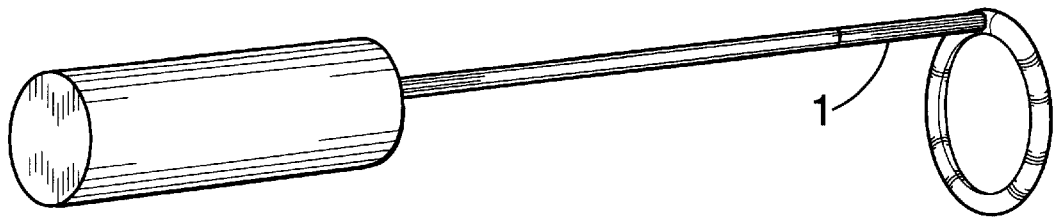
FIG. 1—Is a prospective view of an embodiment of a tool in accordance with the invention.
Figure 2:
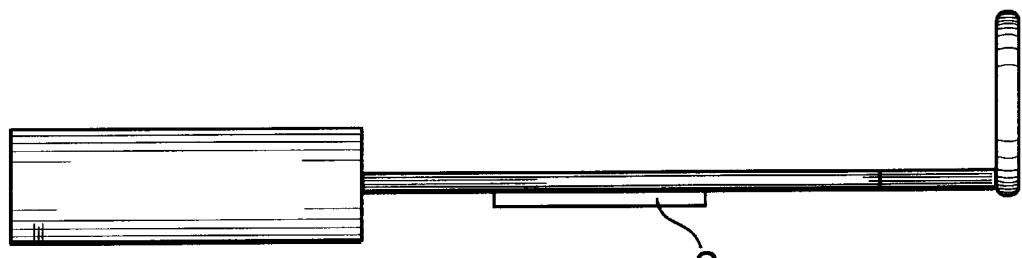
FIG. 2—Is a side elevation of the tool shown in FIG. 1
Figure 3:
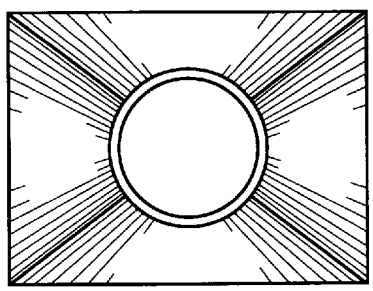
FIG. 3—Is a plan view of a stand for the tool shown in FIG. 1.
Figure 4:
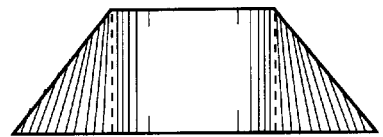
FIG. 4—Is a side elevation of the stand shown in FIG. 3.

The head, tail and gut are first removed from the fish to be de-boned. The tool shown in FIG. 1 is preferably mounted upright on the stand shown in FIGS. 3 and 4. The ring at the end of the shaft may be exchange for a different diameter ring depending on the size of the fish, by being slipped into the sleeve 1 provided on the shaft. A set of variously sized rings may be provided to accommodate the removal of different spinal sizes.

The cut end of the spinal column at the gill portion of the fish is inserted into the top of the ring and the fish is pushed down over the tool until the spinal column passes through being completely separated from the flesh and detached. The spine and the tool may then be removed from the fish.

The shaft if desired may be provided with the fish scale remover 2.

While the invention has been described with reference to the specific embodiments, various changes and modifications will become apparent to the skilled artisan. The invention is only intended to be limited by the appended claims or their equivalents.

What I claim is:

1. Method for the removal of the spinal bones from fish, which comprises positioning an annular member around the spine of a deheaded fish; forcing said annular member along the spine from the head to tail portion of the fish to thereby detach the spinal column, and thereafter pulling out the spine.

2. Method according to claim 1, in which said annular member is in the form of a ring mounted on the end of a rod with its plane extending substantially transverse to the rod.

3. Method according to claim 2 in which said fish is a freshwater fish.

4. Method according to claim 1 in which said fish is one having had its tail removed.

5. A device for carrying out the method of claim 1, comprising a stand, a shaft vertically mounted on said stand, a ring attached to the free end of the shaft with its plane substantially transverse to the axis of the shaft, said ring being of a size sufficient to encircle the spine of a fish and detach the spine upon being passed along it, said ring being free of any cutting edges.

6. Device according to claim 5 in which said ring is detachable connected to said shaft, and including at least one different size ring for attachment to said shaft.

* * * * *